United States Patent

Smith et al.

[15] 3,635,149
[45] Jan. 18, 1972

| [54] | CONTINUOUS FRYING DEVICE |
|---|---|
| [72] | Inventors: Benjamin C. Smith; Ernest R. Pridham, both of Lunenburg, Nova Scotia, Canada |
| [73] | Assignee: National Sea Products Limited, Halifax, Nova Scotia, Canada |
| [22] | Filed: Nov. 3, 1970 |
| [21] | Appl. No.: 86,530 |

Related U.S. Application Data

[63] Division of Ser. No. 693,461, Dec. 26, 1967.

[30] Foreign Application Priority Data

Oct. 25, 1967 Canada.....................................3,406

[52] U.S. Cl..................................99/404, 99/407, 198/33
[51] Int. Cl. .................................................A47j 37/12
[58] Field of Search ............................99/404, 405–406, 99/407, 238.5, 386, 420, 427, 443 C; 198/33, 129, 183, 194, 197; 118/30, 423

[56] References Cited

UNITED STATES PATENTS

| 538,443 | 4/1895 | Ferguson | 198/194 X |
| 1,686,596 | 10/1928 | Betz | 99/405 X |
| 2,704,150 | 3/1955 | Scranton | 198/197 |
| 2,926,597 | 3/1960 | Porambo | 99/405 X |
| 3,149,978 | 9/1964 | Anderson et al. | 99/404 UX |
| 3,440,953 | 4/1969 | Griffon | 99/404 X |
| 3,462,001 | 8/1969 | Boyce | 198/33 AA |

Primary Examiner—Walter A. Scheel
Assistant Examiner—Arthur O. Henderson
Attorney—Cushman, Darby & Cushman

[57] ABSTRACT

The disclosure recites method and apparatus for the deep fat frying of batter coated foodstuffs wherein such foodstuff is supported adjacent the points of a plurality of closely spaced pointed elements during at least the initial stages of the cooking process for a period of time sufficient to allow the batter coating to become adequately cooked thereby to prevent adherence of the latter both to other pieces of foodstuff and to the cooking apparatus during subsequent cooking stages.

11 Claims, 9 Drawing Figures

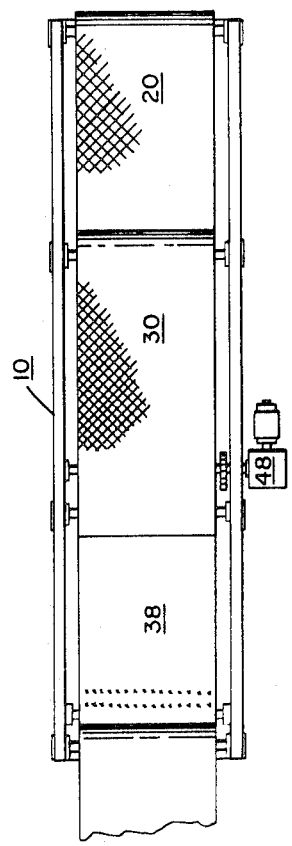

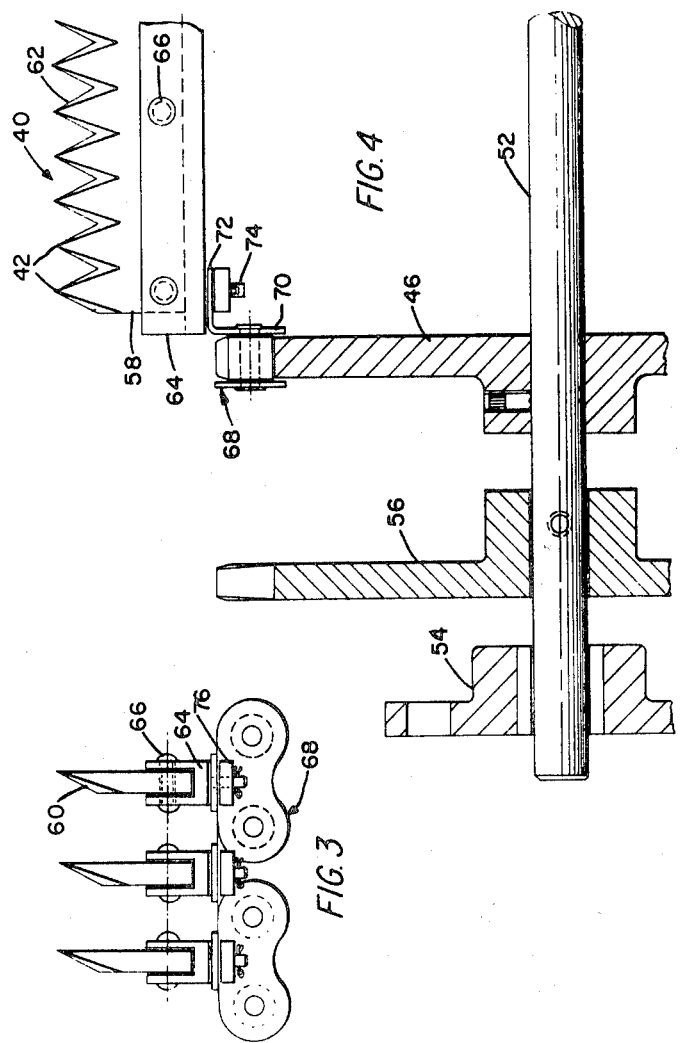

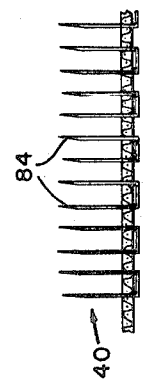
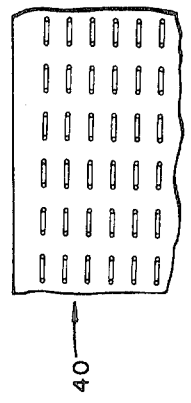
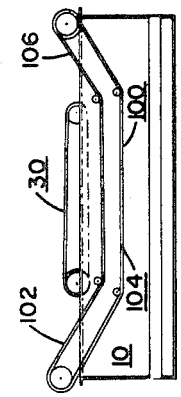
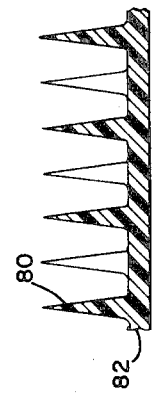
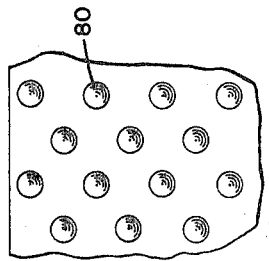

CONTINUOUS FRYING DEVICE

This application is a divisional of U.S. Pat. application Ser. No. 693,461 filed Dec. 26, 1967, now abandoned.

This invention relates to improvements in apparatus for the deep fat frying of foodstuffs, particularly foodstuffs having a so-called batter coating.

Methods and apparatus for frying foodstuffs have been known for many years. Continuous process machines capable of conveying a foodstuff through a bath of heated cooking oil are well known and have been used successfully in the cooking of doughnuts, potato products, and various meat and fish products. The most common type of cooking apparatus includes an elongated tank containing a bath of heated cooking oil. An elongated transfer conveyor extends through the oil bath, the central portion of such conveyor run being completely submerged beneath the oil bath while the end portions thereof are generally inclined to permit gradual immersion of the uncooked foodstuff and gradual removal thereof from the oil. Since most food items become buoyant after being immersed in the cooking oil for a period of time due to moisture loss and/or the use of gas-producing leavening agents in the batter which cause the batter to become porous and much lighter, a holddown conveyor is disposed above the central portion of the transfer conveyor run; this acts to keep the foodstuffs fully submerged in the cooking oil even after they become buoyant due to moisture loss.

In the cooking of many foodstuffs, such as fish fillets, shellfish, meat, poultry products and confectionery products having a pastry "puff" or soft battered coating thereon it has long been the problem that the soft batter of individual pieces of foodstuff tends to adhere to the solid surfaces of the cooking apparatus as well as to other pieces, until such time as the outer surface of the batter, through cooking, becomes sufficiently "nonsticky" as to prevent such adherence of the pieces of foodstuff. Such adherence of the batter surface of the foodstuff detracts from its final, cooked, appearance. This together with the fact that tornoff pieces of batter due to such adherence tend to gradually contaminate the cooking oil and the apparatus, makes the elimination of the above problem very desirable.

The present invention provides an apparatus for facilitating the continuous deep fat frying of soft or puff battered foodstuffs, and which, to a large extent, eliminate the adherence of the batter thereof to the cooking machinery and to other pieces of the food.

The present invention provides apparatus for the supporting and conveying of the soft battered pieces of food on the uppermost extremities of a plurality of relatively closely spaced pointed elements during at least the initial stages of the oil bath cooking process for a period of time sufficient to allow the batter on pieces of food to become adequately cooked as to prevent adherence thereof during subsequent cooking stages. These pointed elements are spaced relatively closely together such that there is substantially no penetration of these pointed elements into the foodstuff. By providing for support of the batter coated foodstuff in this fashion, the problem of adherence of the soft batter coating to the cooking apparatus is substantially eliminated.

The pointed elements, as will be more fully described hereafter are arranged to form the foodstuff supporting region of a conveyor, the latter, in turn, being arranged to carry the pieces of food through at least the initial portion of the bath of cooking oil. The length of the conveyor incorporating such pointed elements, and/or the speed at which the latter is driven, is arranged such that the batter has sufficient time in the cooking oil in which to develop a relatively nonadherent surface while supported on the pointed elements. The conveyor having the pointed elements thereon may extend completely through the fryer; however, it may be found more economical to choose an arrangement wherein the conveyor with the pointed elements extends through only the initial portion of the bath of cooking oil with a conventional conveyor being used to carry the foodstuff (which by that time has a nonadherent surface) through the remainder of the fryer.

In the drawings which illustrate embodiments of the invention:

FIG. 2 is a plan view of the frying apparatus shown in FIG. 1;

FIG. 3 is a side elevation of a section of the novel conveyor belt of the present invention illustrating the structure of the conveyor belt adjacent a marginal edge thereof;

FIG. 4 is a partial sectional, elevational view taken along section line 4—4 in FIG. 1 and looking in the direction of the arrows;

FIGS. 5 and 6 are cross-sectional, elevational views and plan views respectively of a modified form of conveyor belt;

FIGS. 7 and 8 are elevation and plan views respectively of a further modified version of conveyor belt;

FIG. 9 illustrates a conventional deep fat frying apparatus incorporating the novel conveyor belt of the present invention.

Figure 1:
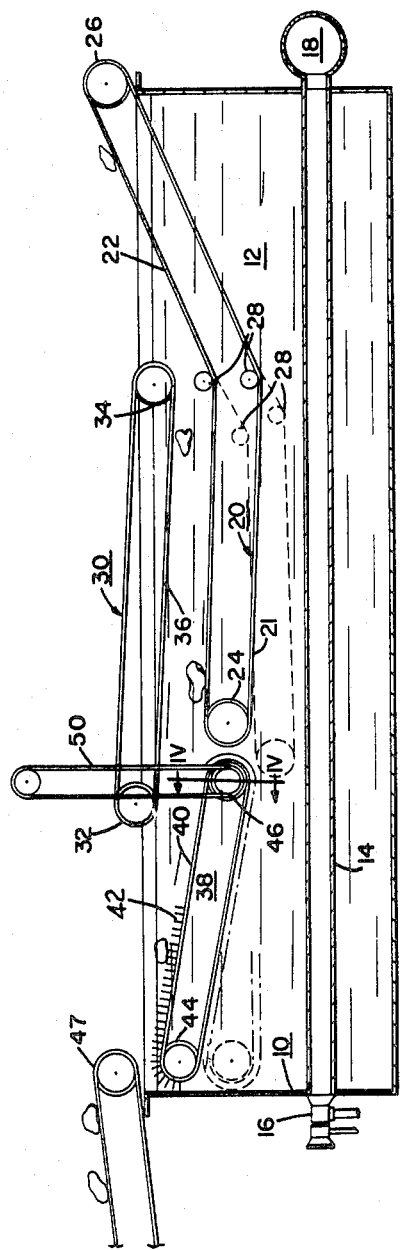
FIG. 1 is an elevational, sectional view taken along the longitudinal axis of a continuous process deep fat fryer incorporating the present invention.

Referring now to the drawings, there is shown in FIG. 1, an elongated generally rectangular in plan tank 10. The tank 10 is adapted to retain a body of cooking oil indicated as 12. Running lengthwise of the tank and spaced above the bottom floor thereof are heating tubes generally indicated at 14. A conventional gas or oil burner 16 directs heated combustion gases through the heating tubes 14 and into the exhaust pipe 18 located at the end of tank 10 opposite to burner 16. Suitable control means (not shown) control the rate at which the fuel is burned thus controlling the temperature of the cooking oil 12 thereby to retain the latter at a suitable cooking temperature. Those skilled in the art will realize that many other types of oil heating devices may be employed in conjunction with the invention.

As shown in FIG. 1, there is provided a conveyor designated as 47 which extends from a batter coating machine (not shown) over to the entrance portion of tank 10. Batter coated food products are carried by conveyor 47 from the batter machine to a position directly over the entrance end of a conveyor section 38. Conveyor section 38 is located in the entrance section of tank 10 and the structure and function of this conveyor section will be more fully described later in this disclosure.

Located in the intermediate and exit end portions of tank 10 is a transfer conveyor indicated at 20. Transfer conveyor 20 includes a generally horizontal section 21 extending in the intermediate portion of tank 10, and a generally upwardly inclined section 22 which extends from the intermediate portion of tank 10 to the exit end of the latter. The transfer conveyor 20 includes suitable sprocket or nose roll means 24 located in the intermediate tank section together with sprocket means designated as 26 located well above the level of oil bath 12 adjacent the exit end of tank 10. Suitable guide roller or guide strip means 28 are positioned intermediate the horizontal run 21 and the inclined run 22 of the transfer conveyor 20. Conveyor section 21 may assume two different positions as shown in FIG. 1. In the case of food items which become buoyant and float off the entrance end conveyor section 38, the top surfaces of sections 38 and 21 may be, at their junction, in the same plane, as shown in full lines. In the case of food items which do not or might not, become buoyant before they reach the end of conveyor section 38, conveyor section 21 must be arranged as shown in dotted lines, with its one end underlying the end of conveyor section 38 so that food items coming off the latter will drop downwardly onto section 21.

Positioned above the transfer conveyor 20, in the intermediate section of tank 10, is a holddown conveyor 30. The holddown conveyor is trained about a suitable roller or sprocket means 32 and 34 respectively. The lowermost run 36 of transfer conveyor 30 is positioned such that it is disposed below the surface of the oil bath 12 and in spaced, generally parallel relationship to the uppermost run of the intermediate portion 21 of the transfer conveyor 20.

Suitable drive means (not shown) are provided for both the transfer conveyor 20 and the holddown conveyor 30; details of a suitable drive mechanism will be well known to those skilled in the art and a description thereof is believed unnecessary.

The belt for both the holddown conveyor 30 and the transfer conveyor 20 may conveniently be made from a woven stainless steel mesh. Conveyor belts of this nature are well known in the art and are commercially available.

In the entrance section of tank 10, there is provided the previously referred to conveyor section 38 including a conveyor belt 40 which, in accordance with the invention, has a surface comprising a plurality of pointed elements 42. The conveyor belt 40 is trained about suitable spaced pairs of sprockets 44 and 46. The sprockets 46 constitute the drive sprockets, the latter being driven from drive mechanism 48 via a suitable drive chain 50. The drive mechanism 48 conveniently comprises a positive, infinitely variable drive and motor arrangement which permits the conveyor belt 40 to be driven at varying rates of speed.

As clearly shown in FIG. 1, the sprocket or roller means 44 can be mounted in an adjustable fashion such that it may be shifted upwardly or downwardly. In the lowermost position of sprocket 44 the conveyor section 38 is generally horizontal, as shown in dotted lines in FIG. 1. In the uppermost position of sprocket 44, the conveyor section 38 is downwardly inclined from the entrance end of tank 10 towards the intermediate portion of the latter. By providing the conveyor belt section 38 with an incline, the food product which is placed thereon is gradually immersed in the cooking oil 12; this is due to the fact that the uppermost portion of conveyor section 38 closely adjacent the entrance end of tank 10 is disposed slightly above the level of the cooking oil 12 when conveyor section 38 is inclined.

Further details of the means for driving conveyor section 38 are shown in FIG. 4. This view, as previously indicated, is taken along the section line 4—4 in FIG. 1 and shows a shaft 52 to which the sprocket means 46 is secured. The shaft 52 is journaled in suitable bearing means 54 with the latter being attached in any suitable manner to the inner sidewall of tank 10. Also as shown in FIG. 4, the shaft 52 is driven in rotation by a further sprocket means 56 the latter also being secured to shaft 52 and driven by the previously referred to chain 50.

The construction of the preferred form of conveyor belt will also be evident from FIGS. 3 and 4. The conveyor belt 40 generally comprises a plurality of elongated strips of material 58 which extend in spaced parallel relationship to one another transversely of the conveyor belt i.e., across the width of the belt. The strips 58 are beveled as at 60 in FIG. 3 and are furthermore provided with a plurality of generally V-shaped notches 62 as best shown in FIG. 4, thereby to provide a plurality of relatively sharp points 42 along the entire length of each strip 58.

The individual strips 58 are supported in generally U-shaped in cross section saddles 64 which extend the entire length of each strip 58. The strips 58 are secured to their associated saddles 64 by means of suitable bolts or rivets 66 which extend completely through the walls of the saddle and through the strip. The saddles 64 are preferably made of a strong material, such as steel, which is sufficiently thick as to prevent sagging of the strips 58 throughout the length thereof.

The opposed marginal edges of the conveyor belt 40 are defined by a pair of spaced roller chains, one of which is shown in FIG. 3 and designated 68. The roller link plates 70 of roller chain 68 which face inwardly towards the center of conveyor belt 40 are each provided with a lug 72 which is generally at right angles to the face of the link plate. Opposing ends of each of the saddles 64 are attached to the roller chain 68 by means of pins 74 which extend through the lugs 72 and are secured to the latter by means of suitable washer and cotter pin arrangement 76.

As mentioned previously it is important that the material from which the strips 58 are made be correctly chosen so as to avoid sticking thereto of the freshly battered food product during the initial stages of cooking. The most suitable material for strips 58 is tetrafluoroethylene polymer, commonly known under the registered trademark "Teflon."

FIGS. 5 and 6 show a modified version of the conveyor belt 40 wherein the entire belt is made from "Teflon" with the spikes 80 integrally molded with the body of the belt. When utilizing this version, the roller chains 68 are not required and, instead of using sprocket means 56, suitable elongated roller means are used. When utilizing a belt such as shown in FIGS. 5 and 6, it is important that the body portion of the belt 82 be made sufficiently thin so that the belt is reasonably flexible thus allowing the latter to move smoothly over its supporting rollers.

A further modification of the conveyor belt 40 is shown in FIGS. 7 and 8. In this modification, a plurality of generally U-shaped metal inserts of polished stainless steel defining a plurality of support points 84 are inserted through a woven fabric of material capable of standing up to the temperatures of the cooking oil 12. In this embodiment the construction of the belt 40 would be somewhat similar to the construction of the "-carding" commonly utilized in textile fiber combing machines.

Although in the preferred form of the invention, as illustrated in FIGS. 1 and 2, the spiked surface conveyor belt has been shown as extending only through the entrance zone of the tank 10, it should be realized that the spiked surface belt may be utilized in conventional deep fat frying apparatus as illustrated in FIG. 9. FIG. 9 shows a convention fryer including an elongated oil holding tank 10 having a main conveyor 100 therein extending from the entrance portion to the exit portion of tank 10. The main conveyor 100 includes a downwardly inclined entrance section 102, a generally horizontal intermediate section 104 and an upwardly inclined exit section 106. Positioned above the intermediate section 104 is a conventional holddown conveyor 30. Both the main conveyor 100 and the holddown conveyor 30 are driven in conventional manner by suitable drive means (not shown).

In the operation of the device with reference to FIGS. 1 and 2, the freshly coated product is conveyed via conveyor 47 to the entrance end of tank 10 and is deposited on the upper surface of the spiked belt 40. It should be realized here that the individual points 42 on belt 40 are sufficiently closely spaced as to prevent any substantial penetration of such points into the foodstuff. In other words, the foodstuff is supported adjacent the uppermost extremities of the points 42. Hence, to avoid penetration of such points on the belt into the foodstuff, they should be spaced no more than about 1 inch apart with about three-eighths inch spacing being preferred. These figures may vary somewhat depending upon the particular foodstuff being processed but they will serve as a guide TO those skilled in the art.

In the case of foodstuffs which remain nonbuoyant during the initial cooking stages, such foodstuffs are conveyed through oil 12 by the conveyor section 38 for a period of time sufficient to allow the outer surface of the batter to develop a nonadherent surface. Until such time as the nonadherent surface develops, the foodstuff should not leave the conveyor section 38 if adherent of the batter coating both to the machine and to other pieces of foodstuff is to be avoided. Hence, the length of the conveyor section 38 and the speed at which belt 40 is driven may easily be chosen to meet the conditions specified above. It should also be realized that many battered items which become buoyant will float off the conveyor section 38. When this happens the battered items will have developed their nonadherent surfaces. Therefore the length of the conveyor section 38 and the speed at which belt 40 is driven are determined, in this instance, by the longest time it takes the foodstuff to become buoyant. All of the factors mentioned above can readily be determined by empirical methods. It should also be noted that the variable speed drive arrangement 48 is of great assistance here since by varying the speed of movement of belt 40, the period of time during which the foodstuff is supported on belt 40 may readily be varied. As a practical example, assuming that the total cooking time for the foodstuff is 90 seconds, the period of time during which the foodstuff is supported on the spike belt 40 would be in the order of 10–20 seconds; however, this would vary with the type of batter, the darkness or degree of frying required, the type and color of the cooking oil and the temperature of the latter.

After the foodstuff leaves the conveyor section 38 it passes onto the transfer conveyor 20 or, if buoyant, under the holddown conveyor 30 and is conveyed to the inclined section 22 of the transfer conveyor. When the foodstuff emerges from the oil bath 12, it should have the desired amount of cooking and have the desired color. The holddown conveyor 30, in the case of buoyant foods, keeps the foodstuffs fully submerged, thus promoting uniform cooking thereof.

The operation of the modified version shown in FIG. 9 is essentially the same as that described above with the exception that the foodstuff is maintained on the conveyor 100 for the same times as it was on conveyor section 38 or transfer section 20 in the previous description in connection with FIGS. 1 and 2. The presence of the pointed elements on the main conveyor 100 prevents adherence of the foodstuff to the equipment during the initial cooking stages in exactly the same manner as was described above in connection with FIGS. 1 and 2.

We claim:

1. Apparatus for the deep fat frying of a batter coated foodstuff comprising: an elongated tank having entrance, intermediate, and exit sections and adapted to retain an oil bath, means for heating said oil, means for conveying said foodstuff through the tank while submerged in the oil bath from the tank entrance through to the tank exit, the improvement characterized in that at least that portion of said conveying means which conveys the foodstuff from the tank entrance towards the intermediate section of the tank includes a foodstuff supporting region comprising a plurality of relatively closely spaced upwardly directed, sharply pointed elements adapted to support pieces of foodstuff on the upper extremities thereof during conveyance of said pieces of foodstuff by said portion of said conveying means.

2. Apparatus according to claim 1 wherein the pointed elements are of a tetrafluoroethylene polymer.

3. Apparatus according to claim 1 wherein said portion of the conveying means comprises an endless flexible member, and means for propelling the latter in an endless loop to convey foodstuff supported thereon.

4. Apparatus according to claim 3 wherein said conveying means includes a plurality of spaced parallel strips extending transversely of the length thereof, each of said strips having said pointed elements thereon.

5. Apparatus according to claim 4 wherein said portion of the conveyor means is inclined downwardly from the inlet end of the tank towards the intermediate portion thereof thereby to gradually submerge said foodstuff in the oil bath.

6. Apparatus for the deep fat frying of batter-coated pieces of foodstuff comprising an elongated tank having entrance, intermediate, and exit sections and adapted to retain an oil bath, means for heating said oil, means for conveying said foodstuff through the tank while submerged in the oil bath from the tank entrance through to the tank exit, said conveying means comprising endless belt means, means for propelling said belt means to effect said conveying of the foodstuff through the oil bath, and wherein at least that portion of said endless belt means which conveys the foodstuff from the tank entrance towards the intermediate section of the tank defines a foodstuff supporting region comprising a plurality of upwardly directed generally sharply pointed elements sufficiently closely spaced as to support the pieces of foodstuff on the upper extremities of said elements, whereby to permit the batter coating on the pieces of foodstuff to cook and become relatively nonadherent while supported on said pointed elements.

7. Apparatus according to claim 6 wherein said endless belt means includes a plurality of spaced parallel strips extending transversely of the belt, each of said strips carrying thereon a plurality of said pointed elements.

8. Apparatus according to claim 6 wherein said portion of said endless belt means is inclined downwardly from the inlet end of the tank towards the intermediate portion thereof thereby to gradually submerge said foodstuff in the oil bath.

9. Apparatus according to claim 6 wherein the pointed elements comprise a synthetic plastics material capable of withstanding the heated cooking oil.

10. Apparatus according to claim 7 wherein the pointed elements comprise polytetrafluoroethylene polymer.

11. Apparatus according to claim 6 wherein said pointed elements are spaced apart not more than about 1 inch.

* * * * *